United States Patent [19]

Ribaldone et al.

[11] 3,891,650

[45] June 24, 1975

[54] PROCESS FOR PREPARING ANTHRAQUINONE-1-ACETIC ACID AND ESTERS THEREOF

[75] Inventors: Giuseppe Ribaldone, Gallarate; Giampietro Borsotti, Novara, both of Italy

[73] Assignee: Montecatini Edison S.p.A., Milan, Italy

[22] Filed: May 9, 1973

[21] Appl. No.: 358,725

[30] Foreign Application Priority Data
May 10, 1972   Italy ................................. 24170/72

[52] U.S. Cl. ............................................. 260/376
[51] Int. Cl. ............................................. C09b 1/00
[58] Field of Search ................................. 260/376

[56] References Cited
OTHER PUBLICATIONS

Rondestvedt, Organic Reactions, II, pp. 189–260 (1960).
Weygard et al., Preparative Organic Chemistry, P. 847 (1972).
Bott, B., 100, pp. 978–983 (1967).

*Primary Examiner*—Lorraine A. Weinberger
*Assistant Examiner*—E. Jane Skelly

[57] ABSTRACT

Anthraquinone-1-acetic acid and esters thereof are prepared by reacting anthraquinone-1-diazonium salts with 1,1-dichloroethylene in the presence of cuprous salts and $H_2O$ or alcohols.

3 Claims, No Drawings

PROCESS FOR PREPARING ANTHRAQUINONE-1-ACETIC ACID AND ESTERS THEREOF

THE PRIOR ART

Italian Pat. No. 860,016 describes the production of methyl anthraquinone-1-acetate by a Diels-Alder reaction between naphtoquinone and 3,5-methylhexadienoate, followed by dehydrogenation of the reaction product.

The acylation of olefinic compounds using acyl diazonium halides (chlorides and bromides) in the presence of cupric salts as catalysts in a medium buffered at pH3 – 4 and at temperatures below 25°C (Meerwein reaction) has been described in the literature (Organic Reactions, 11, 189 – 260). The reaction does not take place when the diazonium salts have $HSO_4^{(-)}$ as an anion.

The hydrolysis or alcoholysis of trihalides with $H_2SO_4$ is also known (J.A.C.S. 71, 4148 (1940); J.A.C.S. 72, 2464 (1950).

However, no prior report of the hydrolysis or alcoholysis of compounds containing the group

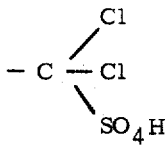

has been found.

THE PRESENT INVENTION

An object of this invention was to provide a new and relatively simple method for obtaining anthraquinone - 1 - acetic acid and esters thereof, which compounds are useful intermediates for the preparation of dyestuffs and, in particular vat dyestuffs, as disclosed in Italian Pat. Nos. 869,691 and 901,929.

In accordance with the invention, and as indicated in the Abstract Of Disclosure, the anthraquinone - 1 - acetic acid and esters thereof are prepared from anthraquinone-1-diazonium salts and 1,1-dichloroethylene by reacting the salts and chlorinated olefin in the presence of cuprous salts and $H_2O$ or alcohols. The reaction proceeds as shown below:

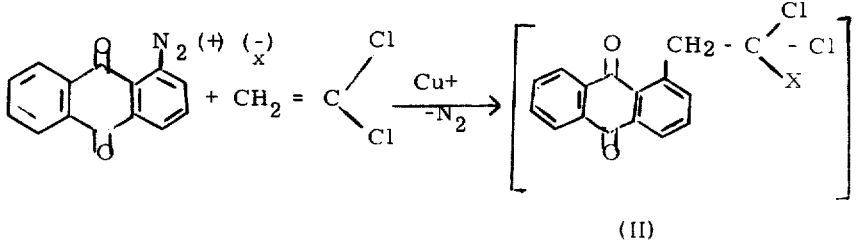

$X = HSO_4^{(-)}$
$R = H, C_1 - C_5$ alkyl

We found that if a cuprous salt is added to a mixture of anthraquinone-1-diazonium salt, 1,1-dichloroethylene and $H_2O$ or alcohols kept at a temperature ranging from 25°C to 35°C (and at room temperature), the reaction sets in immediately with the formation of $N_2$. Once the $N_2$ evolution has stopped, and after heating the reaction mixture to convert the intermediate (II) completely to the acid or ester, the latter separate from the reaction mixture in solid form and can be isolated by filtering.

The process of this invention has a number of advantages over the prior art. One is that the reaction is independent of the reaction medium so that it is not necessary to control the pH or add buffering substances. Another is that the reaction is not inhibited by alcohols. This is a very important feature of the present process, inasmuch as it is possible to obtain the esters directly from the anthraquinone acetic acid by operating in an alcoholic medium. Still another advantage, and one that was not predictable, resides in the possibility of provoking the reaction between the anthraquinone diazonium salt and 1,1-dichloroethylene when the salifying anion is $HSO_4^{(-)}$. This is important because the anthraquinone diazonium sulphate is more easily prepared and can be obtained in much purer form than the anthraquinonazium halides.

The hydrolysis and the alcoholysis of intermediate (II) takes place directly in the diazonium medium without the addition of other substances, for instance without the addition of $H_2SO_4$.

The following examples are given to illustrate the invention and are not intended to be limiting.

EXAMPLE 1

Into a flask provided with a thermometer, a stirrer, a reflux coolant connected at its lower part with a valve containing sulphuric acid for controlling the development of gas, there were introduced:

15 g of anthraquinone-diazonium sulphate, at 97% (0.043 moles), 48.4 g (0.50 moles) of 1,1-dichloroethylene and 100 cc 99% methanol.

The mixture was heated to 30°C and then there were admixed 0.2 grams of cuprous chloride. Thereupon, nitrogen immediately started to develop. The temperature was maintained at 30° – 35°C by external refrigeration in a water bath, in as much as the reaction is of an

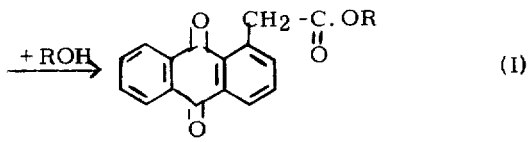

exothermic character. After about 30 minutes, the development of nitrogen stopped and from the mixture there started to form a methyl ester precipitate. Thereupon, the mixture was stirred for 30 minutes, then the reflux coolant was removed and a distilling head was applied. Distilling was carried on until the vapors has reached 65°C. Thereby were obtained 60 cc of distillate containing 32.5 g of 1,1-dichloroethylene, which was recycled into a successive operation, reintegrating it with methanol and 1,1-dichloroethylene.

The reaction mixture was refluxed for 30 minutes and then cooled down to 20°C whereupon the precipitate was filtered and washed with methanol, then with a diluted solution of ammonia, and finally with water until it was neutral.

Thereby were obtained 11.2 g of methyl anthraquinone-1-acetate which had a titer of 97.9%, corresponding to a yield of 98%.

A sample of the product when crystallized from butanol or sublimated under vacuum, melts at 190.5° – 191.5°C.

EXAMPLE 2

Example 1 was repeated, using the same equipment and the same operating conditions, and the following materials:

15 g (0.043 mole) of 97% anthraquinone-1-diazonium sulphate,
48.4 g (0.50 mole) of 1,1-dichloroethylene,
100 cc of ethanol at 99.5% and
0.2 of cuprous chloride.

In this case the distillation was carried on until the vapors attained 78°C. Thereby were recovered 33 g of 1,1-dichloroethylene and 10.8 g of ethyl anthraquinone-1-acetate were obtained with a titer of 83%, corresponding to a yield of 69.5%.

A sample of the product, purified by sublimation under vacuum or by crystallization from butanol, melted at 203.5° – 204°C.

The elementary analysis, the infra-red spectrum and the N.M.R agree with the structure of the compound.

EXAMPLE 3

Operating with the same equipment described in Example 1, the following substances were reacted with each other:

15 grams of anthraquinone-1-diazonium sulphate at 97% (0.043 mole),
48.7 g of 1,1-dichloroethylene (0.50 mole),
100 cc of acetone; and
5 cc of water.

The whole mixture was then heated up to 30°C and 0.2 g of cuprous chloride was added to it. During the development of nitrogen the temperature was kept at between 30° and 32°C. The mixture was heated up to 35°C for 30 minutes, thereafter the mass was distilled until the vapours attained 56°C. Thereby 36.3 g of 1,1-dichloroethylene were recovered. The mixture was then cooled down to 20°C and the precipitate was filtered. Thereby 8.0 g of anthraquinone-1-acetic acid were obtained. It had a titer of 95% corresponding to a yield of 65%.

A sample of the product, crystallized from butanol, melted at 245°C.

We claim:

1. Process for the preparation of anthraquinone-1-acetic acid and esters thereof, characterized in that an anthraquinone-1-diazonium sulphate is reacted with 1,1-dichloroethylene in the presence of cuprous salts and $H_2O$ or alkanols containing from 1 to 5 carbon atoms, at temperatures between 25° and 35°C, at atmospheric pressure and after the removal of any unreacted 1,1-dichloroethylene, the anthraquinone-1-acetic acid or ester thereof is separated from the reaction medium in solid form.

2. The process according to claim 1, characterized in that the anthraquinone-1-diazonium salt and 1,1-dichloroethylene are reacted in $H_2O$.

3. The process according to claim 1, characterized in that the anthraquinone-1-diazonium salt and 1,1-dichloroethylene are reacted in an alkanol containing from 1 to 5 carbon atoms.

* * * * *